United States Patent
Zawawy

(10) Patent No.: US 7,464,375 B2
(45) Date of Patent: Dec. 9, 2008

(54) METHOD FOR FLATTENING HIERARCHICALLY STRUCTURED FLOWS

(75) Inventor: Hamzeh Zawawy, Scarborough (CA)

(73) Assignee: International Business Machines Corporation, Armonk, NY (US)

( * ) Notice: Subject to any disclaimer, the term of this patent is extended or adjusted under 35 U.S.C. 154(b) by 588 days.

(21) Appl. No.: 10/875,930

(22) Filed: Jun. 24, 2004

(65) Prior Publication Data

US 2005/0289528 A1 Dec. 29, 2005

(51) Int. Cl.
*G06F 9/45* (2006.01)

(52) U.S. Cl. .................... 717/155; 717/144; 717/156

(58) Field of Classification Search ............... 717/144, 717/155, 156
See application file for complete search history.

(56) References Cited

U.S. PATENT DOCUMENTS

| | | | |
|---|---|---|---|
| 6,240,422 B1 * | 5/2001 | Atkins et al. ............. | 707/105 |
| 6,324,680 B1 * | 11/2001 | Barnfield et al. .......... | 716/18 |
| 6,539,543 B1 | 3/2003 | Guffens et al. | |
| 6,588,009 B1 * | 7/2003 | Guffens et al. ............ | 717/161 |
| 6,650,640 B1 | 11/2003 | Muller et al. | |
| 6,832,357 B2 * | 12/2004 | Saluja et al. .............. | 716/2 |
| 2002/0120919 A1 | 8/2002 | Aizenbud-Reshef et al. | |
| 2002/0133497 A1 | 9/2002 | Draper et al. | |
| 2002/0144020 A1 | 10/2002 | Gooding | |
| 2002/0186661 A1 | 12/2002 | Santiago et al. | |
| 2002/0188930 A1 | 12/2002 | Moser et al. | |
| 2003/0177412 A1 | 9/2003 | Todd | |
| 2003/0212705 A1 | 11/2003 | Williamson et al. | |
| 2003/0227871 A1 | 12/2003 | Hsu et al. | |
| 2004/0003376 A1 * | 1/2004 | May et al. ................. | 717/132 |
| 2004/0154009 A1 * | 8/2004 | Reynaud .................. | 717/155 |
| 2004/0205742 A1 * | 10/2004 | Das et al. ................. | 717/155 |
| 2005/0125781 A1 * | 6/2005 | Swamy et al. ............ | 717/144 |

OTHER PUBLICATIONS (Sprinkle, J. Agrawal, A. Levendovszky, T. Feng Shi Karsai, G. (Apr. 2003). Domain Model Translation Using Graph Transformations. 10th IEEE International Conference and Workshop on the Engineering of Computer-Computer Systems, 2003. Proceedings. (pp. 159-168).*

* cited by examiner

*Primary Examiner*—Wei Y. Zhen
*Assistant Examiner*—Matthew J Brophy
(74) *Attorney, Agent, or Firm*—Matt Talpis; Gregory K. Goshorn; Greg Goshorn, P.C.

(57) ABSTRACT

There is disclosed a method for flattening hierarchically structured flows using a breadth-first approach. At each level of hierarchy of a hierarchically structured source flow, complex nodes are flattened by one level across the entire breadth of the flow. The results of this flattening are placed in a target flow, and any connections that existed in the source flow are re-established in the target flow in such a way that any data input into the target flow will be processed as if it had been input into the source flow. After a processing iteration, if there are still complex nodes remaining in the target flow, the target flow becomes the next source flow, and the process is repeated until the flow has been completely flattened.

6 Claims, 5 Drawing Sheets

```
201    While <sampleFlow is not flat> loop

202        <! Adding nodes to flatSampleFlow: the compiler first adds all the primitive nodes that
           exist in   sampleFlow to flatSampleFlow. >

203        ListofPrimitiveNodes = GETPrimitiveNodesIn( sampleFlow );
204        flatSampleFlow.ADDNodes( ListofPrimitiveNodes )

205        <! The compiler then loads the meta of each complex node and retrieves all the nodes
           that are contained inside this complex node and adds them to flatSampleFlow. >

206        for <each node  > in <sampleFlow>

207            if < node > is < complex >
208            complexNode := node
209                ListofPrimitiveNodes = Get_PrimitiveNodesIn(complexNode );
210                flatSampleFlow.ADDNodes( ListofPrimitiveNodes )
211                if < any of the nodes inside complexNode > is <  a complex node > then
212                    flatSampleFlow.flatStatus = false,
213                        <! at least one more iteration is needed before sampleFlow is completely
                           flat>
214                end if
215            end if
216        end loop 217        <! Adding connections to flatSampleFlow. >
218        <! Add all the connections that exist between nodes within each complex node. >

219        for a connection aCon whose originNode and destinationNode are not complex nodes:
220            add aCon to flatSampleFlow.

221        for a connection aCon whose destinationNode is a complex node:
222            - if the originNode is a primitive node: re-establish connection aCon such that originNode is
              connected to a node in each subflow that was previously connected to an "auxiliary" input
              node of the destinationNode, maintaining the same node Terminal connections
223            - if the sourceNode is not a primitive node: re-establish connection aCon such that a node in
              each subflow that was previously connected to an "auxiliary" output node in the originNode is
              connected to a node in each subflow that was previously connected to an "auxiliary" input
              node in the destinationNode, maintaining the same node Terminal connections
224            - add aCon to flatSampleFlow
225        end loop 226        for a connection aCon whose originNode is a complex node:
227            - if the destinationNode is a primitive node: re-establish connection aCon such that a node in
              each subflow that was previously connected to an "auxiliary" output node of the originNode is
              connected to the destinationNode, maintaining the same node Terminal connections
228            - if the destinationNode is not a primitive node: re-establish connection aCon such that a
              node in each subflow that was previously connected to an "auxiliary" output node in the
              originNode is connected to a node in each subflow that was previously connected to an
              "auxiliary" input node in the destinationNode, maintaining the same node Terminal
              connections
229            - add aCon to flatSampleFlow
230        end loop
231    end loop (main loop)
```

FIG. 2

METHOD FOR FLATTENING HIERARCHICALLY STRUCTURED FLOWS

COPYRIGHT NOTICE AND PERMISSION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The present invention relates to software compilers, and more particularly to a method and system for flattening hierarchically structured flows commonly found in flow programming.

Flow programming involves modeling data flows through an arrangement of nodes and connectors. The interconnected arrangement of nodes and the data flows passing through the arrangement are referred to collectively as a "flow".

In flow programming, applications may be built from a set of building blocks comprising different types of "primitive" nodes and connectors. In the context of the present discussion, primitive nodes are nodes that cannot be "flattened" further (as detailed below). To support a more compact hierarchical structure, "complex" nodes may be introduced. A complex node contains one or more "subflows", where each "subflow" may comprise one or more nodes. The one or more nodes in each subflow may either be a primitive node or another complex node having its own subflow or subflows. In this manner, a multi-level hierarchical structure of virtually any size may be built.

While it may be convenient to use a hierarchical structure to model a flow, it is not always possible to maintain such a structure. For example, in an application involving a transaction between two disparate systems, one system may not be able to understand a hierarchically structured flow built in another system, and vice versa. In this case, it may be necessary to convert the hierarchically structured flow into an equivalent flat flow which performs in essentially the same way as the hierarchically structured flow. This flat flow may then be deployed into an intermediary system acting as a broker between the disparate systems.

Known techniques for flattening hierarchically structured flows are generally functional, but may be inefficient when used with certain types of hierarchically structured flows. In particular, a more efficient technique is needed for flattening hierarchically structured flows having significant breadth.

SUMMARY OF THE INVENTION

The present invention provides a method and system for flattening hierarchically structured flows using a breadth-first approach.

At each level of hierarchy of a hierarchically structured source flow, complex nodes are flattened by one level across the entire breadth of the flow. The results of this flattening are placed in a target flow, and any connections that existed in the source flow are re-established in the target flow in such a way that data input into the target flow will be processed as if it had been input into the source flow. After a processing iteration, if there are still complex nodes remaining in the target flow, the target flow becomes the new source flow, and the process is repeated until the flow has been completely flattened.

In an embodiment of the invention, there is provided a computer system-implemented method of flattening a hierarchically structured source flow, the source flow including at least two levels of hierarchy with each level of hierarchy including one or more nodes interconnected by connectors, the computer system-implemented method comprising:

(i) identifying, at a current top level of hierarchy in the source flow, any primitive node;

(ii) adding to a target flow the primitive node identified in (i);

(iii) identifying, at the current top level of hierarchy in (i), any complex node, each complex node containing at least one subflow with one or more nodes interconnected by connectors;

(iv) adding to the target flow the at least one subflow in place of the complex node identified in (iii);

(v) re-establishing connections between any nodes and subflows added to the target flow, and maintaining node terminal connections such that any data flowing through the target flow is processed as if through the source flow.

In an embodiment, the computer system-implemented method further comprises:

(vi) identifying whether there are remaining complex nodes in the target flow, and if so, providing an indication thereof.

In another embodiment, the computer system-implemented method further comprises:

(vii) responsive to the indication of remaining complex nodes in the target flow, defining the target flow to be a new source flow, defining a new target flow, and repeating each of (i) to (v) for the new source flow.

In another embodiment, at (v), re-establishing connections between any nodes and subflows added to the target flow proceeds as follows:

a connection in the source flow that connects an origin primitive node to a destination primitive node is re-established in the target flow without modification;

a connection in the source flow that connects an origin primitive node to a destination complex node is replaced in the target flow by a re-established connection that connects the origin primitive node to a node in each subflow that was previously connected to an input node of the destination complex node;

a connection in the source flow that connects an origin complex node to a destination primitive node is replaced in the target flow by a re-established connection that connects a node in each subflow, that was previously connected to an output node of the origin complex node, to the destination primitive node;

a connection in the source flow that connects an origin complex node to a destination complex node is replaced in the target flow by a re-established connection that connects a node in each subflow that was previously connected to an output node in the origin complex node, to a node in each subflow that was previously connected to an input node in the destination complex node.

In another embodiment, the computer system-implemented method further comprises:

(vi) identifying whether there are remaining complex nodes in the target flow, and if so, providing an indication thereof.

In another embodiment, the computer system-implemented method further comprises:

(vii) responsive to the indication of remaining complex nodes in the target flow, defining the target flow to be a new source flow, defining a new target flow, and repeating each of (i) to (v) for the new source flow.

In another aspect of the invention, there is provided a computer system comprising a processor and computer readable memory, the memory storing software for flattening a hierarchically structured source flow, the source flow including at least two levels of hierarchy with each level of hierarchy including one or more nodes interconnected by connectors, the software adapting the system to:

(a) identify, at a current top level of hierarchy in the source flow, any primitive node;

(b) add to a target flow the primitive node identified in (a);

(c) identify, at the current top level of hierarchy in (a), any complex node, each complex node containing at least one subflow with one or more nodes interconnected by connectors;

(d) add to the target flow the at least one subflow in place of the complex node identified in (c);

(e) re-establish connections between any nodes and subflows added to the target flow, and maintain node terminal connections such that any data flowing through the target flow is processed as if through the source flow.

In an embodiment, the software further adapts the system, at (e), to re-establish connections between any nodes and subflows added to the target flow as follows:

a connection in the source flow that connects an origin primitive node to a destination primitive node is re-established in the target flow without modification;

a connection in the source flow that connects an origin primitive node to a destination complex node is replaced in the target flow by a re-established connection that connects the origin primitive node to a node in each subflow that was previously connected to an input node of the destination complex node;

a connection in the source flow that connects an origin complex node to a destination primitive node is replaced in the target flow by a re-established connection that connects a node in each subflow, that was previously connected to an output node of the origin complex node, to the destination primitive node;

a connection in the source flow that connects an origin complex node to a destination complex node is replaced in the target flow by a re-established connection that connects a node in each subflow that was previously connected to an output node in the origin complex node, to a node in each subflow that was previously connected to an input node in the destination complex node.

In another aspect of the invention, there is provided a computer readable medium containing computer executable code that when loaded at a computer system is operable for flattening a hierarchically structured source flow, the source flow including at least two levels of hierarchy with each level of hierarchy including one or more nodes interconnected by connectors, the computer executable code adapting the computer system to:

(a) identify, at a current top level of hierarchy in the source flow, any primitive node;

(b) add to a target flow the primitive node identified in (a);

(c) identify, at the current top level of hierarchy in (a), any complex node, each complex node containing at least one subflow with one or more nodes interconnected by connectors;

(d) add to the target flow the at least one subflow in place of the complex node identified in (c);

(e) re-establish connections between any nodes and subflows added to the target flow, and maintain node terminal connections such that any data flowing through the target flow is processed as if through the source flow.

In another aspect of the invention, there is provided a computer system for flattening a hierarchically structured source flow, the source flow including at least two levels of hierarchy with each level of hierarchy including one or more nodes interconnected by connectors, the computer system comprising:

(a) means for identifying, at a current top level of hierarchy in the source flow, any primitive node;

(b) means for adding to a target flow the primitive node identified in (a);

(c) means for identifying, at the current top level of hierarchy in (a), any complex node, each complex node containing at least one subflow with one or more nodes interconnected by connectors;

(d) means for adding to the target flow the at least one subflow in place of the complex node identified in (c);

(e) means for re-establishing connections between any nodes and subflows added to the target flow, and maintaining node terminal connections such that any data flowing through the target flow is processed as if through the source flow.

These and other aspects of the invention will become apparent from the following more particular descriptions of exemplary embodiments of the invention.

BRIEF DESCRIPTION OF THE DRAWINGS

In the figures which illustrate exemplary embodiments of the invention:

FIG. 2 shows illustrative pseudo-code for a method in accordance with an embodiment of the invention;

DETAILED DESCRIPTION OF THE INVENTION

Figure 1:
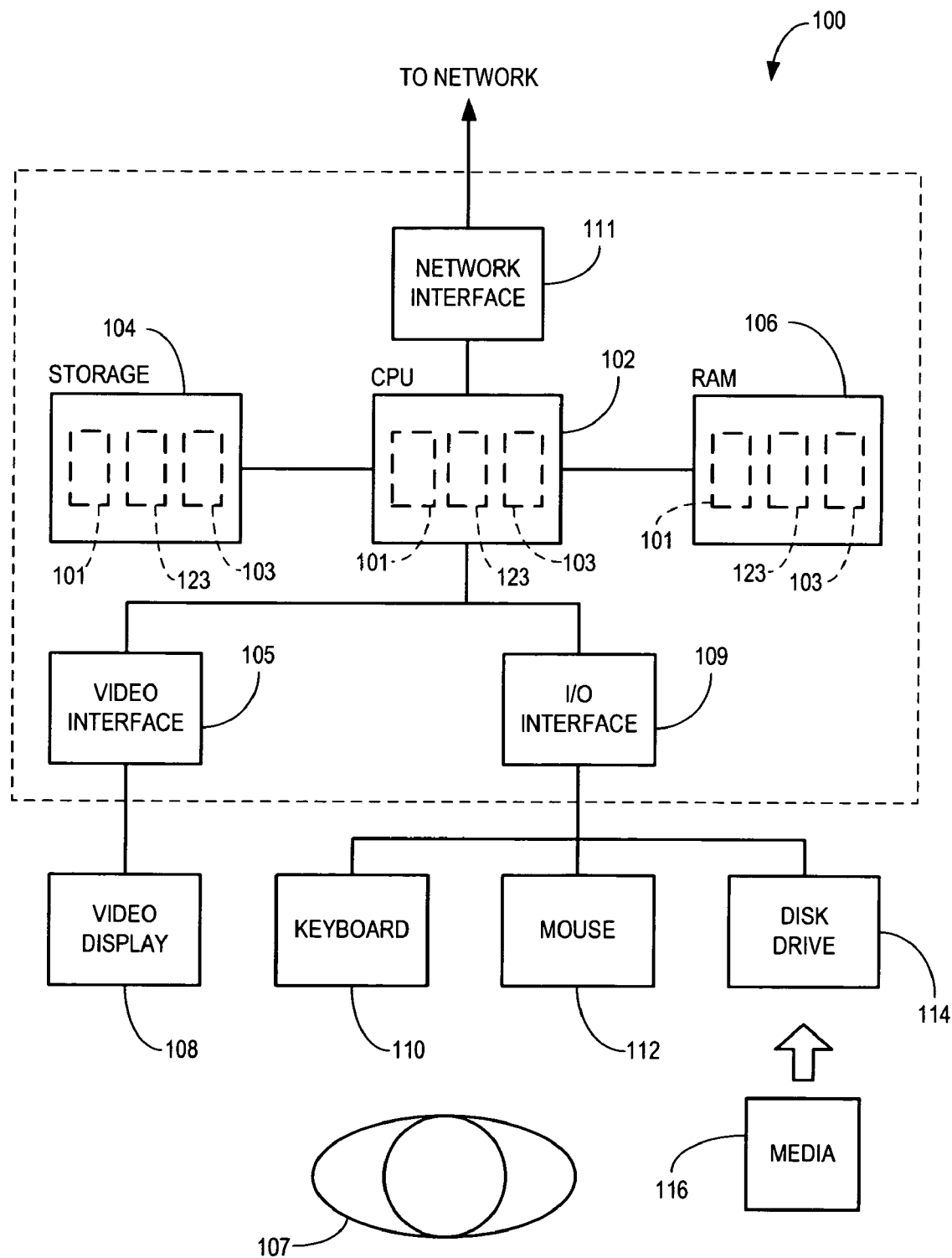
FIG. 1 is a schematic block diagram of a computer system which may provide an operating environment for practicing exemplary embodiments of the invention.

FIG. 1 shows a schematic block diagram of a computer system which may provide an operating environment for practicing exemplary embodiments of the invention. The computer system 100 may include a central processing unit ("CPU") 102 connected to a storage unit 104 and to a random access memory ("RAM") 106. The CPU 102 may process an operating system 101, a flow programming compiler 103, and a message broker 123 (described in further detail below). The operating system 101, message broker 123 and compiler 103 may be stored in the storage unit 104 and loaded into RAM 106, as required. A user 107 may interact with the computer system 100 using a video display 108 connected by a video interface 105, and various input/output devices such as a keyboard 110, mouse 112, and disk drive 114 connected by an I/O interface 109. The disk drive 114 may be configured to accept computer readable media 116. The computer system 100 may be network enabled via a network interface 111, allowing the computer system 100 to communicate with compatible computer systems (not shown) across a network. It will be appreciated that the computer system 100 of FIG. 1 is illustrative, and is not meant to be limiting in terms of the type of system which may provide a suitable operating environment for practicing the present invention.

As will be described below, compiler 103 may be configured to flatten hierarchically structured flows in accordance with an embodiment of the invention. Compiler 103 may also be configured to interact with message broker 123 so that a message may be transferred to and received from another system (not shown) via network interface 111. As an illustrative example, message broker 123 may comprise IBM's WebSphere Business Integration Message Broker™ (WBIMB). WBIMB requires flattening of hierarchically structured flows in order to broker a transaction between two or more systems.

In accordance with an illustrative embodiment of the invention, compiler 103 may be configured to flatten hierarchically structured flows using the following general approach:

I. First, load the source flow to be flattened. Define a temporary target flow for storing a new version of the source flow flattened by one hierarchical level. At a current top level of hierarchy of the source flow, proceed as follows across the entire breadth of the flow:
  a) If a node is a primitive node (i.e. does not contain a subflow), simply add the primitive node to the target flow.
  b) If a node is a complex node (i.e. contains a plurality of nodes including at least one subflow), flatten the complex node by one hierarchical level by adding the subflow(s) to the target flow in place of the complex node.

II. In the target flow, re-establish connections between nodes as follows:
  a) A connection in the source flow that connects two primitive nodes (origin and destination) is re-established in the target flow without modification.
  b) A connection in the source flow that connects an origin primitive node to a destination complex node is replaced in the target flow by a connection that connects the origin primitive node to a node in each destination subflow that was previously connected to an input node of the destination complex node. Since each node can have multiple input or output terminals, the node terminals that are used for connection to each node in the target flow are the same as those used in the source flow.
  c) A connection in the source flow that connects an origin complex node to a destination primitive node is replaced in the target flow by a connection that connects a node in each subflow that was previously connected to an output node of the origin complex node to the destination primitive node. Since each node can have multiple input or output terminals, the node terminals that are used for connection in the target flow are the same as those used in the source flow.
  d) A connection in the source flow that connects two complex nodes (origin and destination) is replaced in the target flow by a connection that connects a node in each subflow that was previously connected to an output node in the origin complex node, to a node in each subflow that was previously connected to an input node in the destination complex node. Again, the node terminals that are used for connection in the target flow are the same as those used in the source flow.
  e) While performing the above, check to see if any complex nodes have been added to the target flow. If so, set a "flattened" flag to false.

III. Once a particular level of hierarchy has been processed, check the "flattened" flag.
  a) If the "flattened" flag indicator is true, then terminate the flattening process. The target flow in the last iteration is the flattened equivalent of the initial hierarchically structured source flow, and can be deployed into the message broker 123 (e.g. for transfer to another system).
  b) If the "flattened" flag indicator is false, repeat I and II using the target flow as the new source flow and another defined temporary target flow.

The general approach described above may also be expressed in illustrative pseudo-code 200, as shown in FIG. 2. Pseudo-code 200 begins at line 201 with a main loop in which the initial hierarchically structured source flow described earlier is now referred to as "sampleFlow". The main loop (line 201-line 231) continues for as long as sampleFlow is not flat. As explained at comments line 202, and as shown at lines 203 and 204, the compiler (i.e. compiler 103 of FIG. 1) adds all primitive nodes from sampleFlow to a target flow referred to as "flatSampleFlow".

At lines 206-216 (as explained at comment line 205), for each node in sampleFlow that is a complex node, the compiler retrieves all nodes contained in the complex node and adds the nodes to the target flow (flatSampleFlow). At lines 211-214, if any node inside a flattened complex node is also a complex node, then a flag "flatSampleFlow.flatStatus" is set to "false". In this case, as noted at comment line 213, at least one more iteration is needed before sampleFlow is completely flattened.

At lines 219-230, as explained at comment lines 217 and 218, connections that existed between nodes in sampleFlow are re-established in flatSampleFlow. More generally, a connection "aCon" is re-established in dependence upon the type of origin node ("originNode") and the type of destination node ("destinationNode") connected by the connection aCon.

At lines 219-220, where both the originNode and destinationNode are not complex nodes, a connection aCon is re-established without any change.

At lines 221-225, from the perspective of a connection aCon whose destinationNode is a complex node, if the originNode is a primitive node, connection aCon is re-established such that the originNode is connected to a node in each subflow that was previously connected to an "auxiliary" input node (e.g. see references 332/342 in FIG. 3, below) of the destinationNode. Particular node terminal connections are maintained. Here, the "auxiliary" input node simply provides a connection point to a subflow or subflows within the complex node. As such, as the hierarchical structure is flattened, the input node may be eliminated.

For a connection aCon whose destinationNode is a complex node, if the originNode is not a primitive node (i.e. is a complex node), connection aCon is re-established such that a node in each subflow that was previously connected to an "auxiliary" output node (e.g. see reference 334/344 in FIG. 3, below) of the originNode is connected to a node in each subflow that was previously connected to an "auxiliary" input node of the destinationNode. Here, again, the "auxiliary" output node simply provides a connection point to a subflow or subflows within the complex node. As such, as the hierarchical structure is flattened, both input nodes and output nodes may be eliminated.

At lines 226-230, from the perspective of a connection aCon whose originNode is a complex node, if the destinationNode is a primitive node, connection aCon is re-established such that a node in each subflow that was previously connected to an "auxiliary" output node of the originNode is connected to the destinationNode. Particular node terminal connections are maintained.

For a connection aCon whose originNode is a complex node, if the destinationNode is not a primitive node (i.e. also a complex node), connection aCon is re-established such that a node in each subflow that was previously connected to an "auxiliary" output node in the originNode is connected to a node in each subflow that was previously connected to an "auxiliary" input node in the destinationNode. (It will be seen that this simply repeats the case where both origin and destination nodes are complex, as at lines 226-230 above. Pseudocode 200 is shown for illustrative purposes only and is not meant to be limiting.)

At line 231, if flag "flatSampleFlow.flatStatus" is "true" (i.e. there are no more complex nodes, as determined at lines 206-216), pseudo-code 200 exits the main loop, as sampleFlow is deemed to be completely flat.

Application of pseudo-code 200 to flatten a hierarchically structured flow will now be explained in the context of an illustrative example.

EXAMPLE

Figure 3:
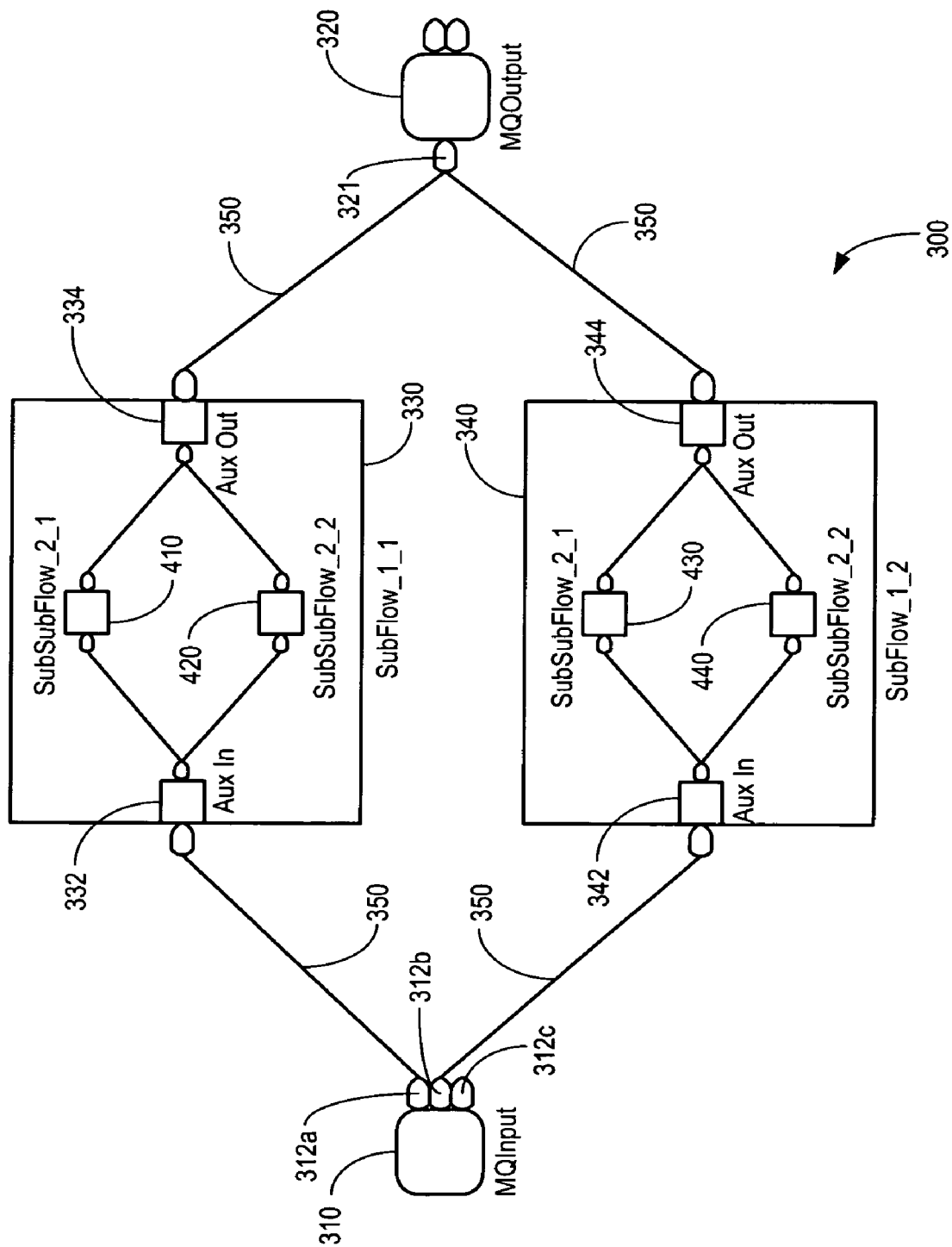
FIG. 3 is a schematic block diagram showing an illustrative hierarchically structured flow containing complex nodes.

FIG. 3 is a schematic block diagram showing an illustrative hierarchically structured source flow 300 (e.g. "sampleFlow" in FIG. 2) having an input 310 labeled "MQInput", an output 320 labeled "MQOutput", and two nested instances of another flow: complex node 330 labeled "Subflow_1_1", and complex node 340 labeled "Subflow_1_2".

In the illustrative example, input node 310 has three output terminals 312a-312c, with output terminal 312a connected to complex node 330 by a connector 350, and output terminal 312b connected to complex node 340 by another connector 350. Output terminal 312c is not connected. Complex nodes 330 and 340 are both connected by connectors 350 to an input terminal 321 of output node 320. (It will be understood that these terminal connections are merely illustrative.)

Pseudo-code 200 starts by loading the initial source flow 300 of FIG. 3 and considering each node in the top level of flow 300 for possible addition to a target flow (e.g. to the "flatSampleFlow" of FIG. 2).

As a first step, any primitive nodes that exist in the top level of the source flow 300 are added to the target flow as is. In the illustrative example, both input 310 (MQInput) and output (MQOutput) are primitive nodes in the top level, and are added to the target flow in their existing form.

If a node is a complex node, as is the case with complex node 330 (Subflow1$_{13}$ 1) and complex node 340 (Subflow1_2), the subflows that are nested inside these complex nodes are added to the target flow in place of the complex nodes. In this example, complex node 330 includes an "auxiliary" input node 332, an "auxiliary" output node 334, and lower level complex nodes 410 and 420. Similarly, complex node 340 includes an "auxiliary" input node 342, an "auxiliary" output node 344, and lower level complex nodes 430 and 440. As the subflows 410, 420, 430, 440 are added to the target flow, the connections 350 are re-established in accordance with pseudo-code 200 in FIG. 2, depending on whether origin and destination nodes are primitive or complex.

Figure 4:
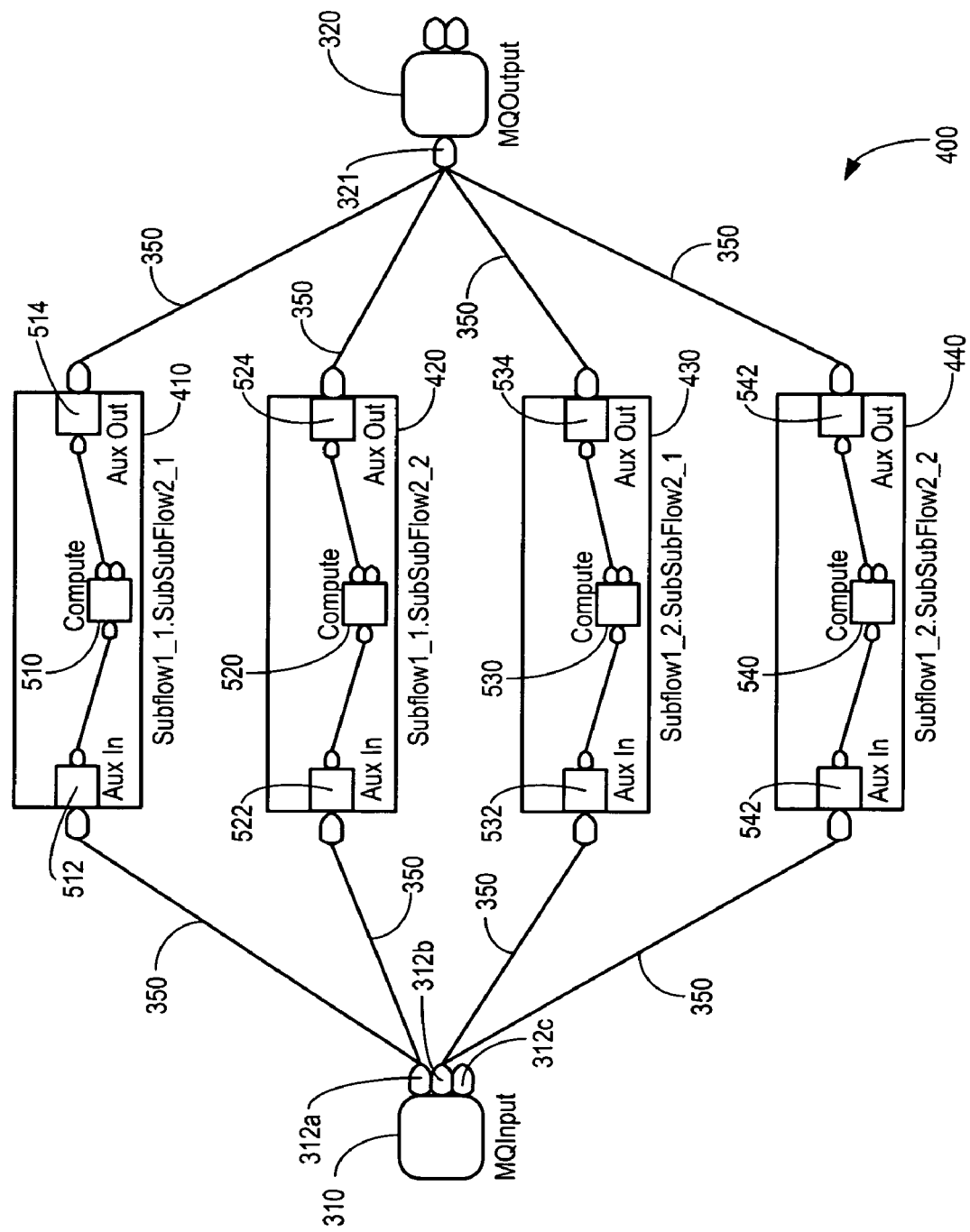
FIG. 4 is a schematic block diagram showing the hierarchically structured flow of FIG. 3 after an iteration of flattening.

The results, after a first iteration of flattening, are shown in target flow 400 in FIG. 4. As shown, complex nodes 410, 420, 430 and 440 have replaced complex node 330 and complex node 340. As well, connectors 350 have been re-established such that, for example, output terminal 312a of input node 310 is now connected directly to each of complex nodes 410 and 420 via "auxiliary" input node 512 and "auxiliary" input node 522 respectively. Similarly, complex nodes 410 and 420 are in turn connected directly to input terminal 321 of output 320 via "auxiliary" output node 514 and "auxiliary" output node 524 respectively. Input node 332 and output node 334 previously shown inside complex node 330 are no longer necessary due to the re-established connections as described above, and are not added to the target flow 400.

Similarly, output terminal 312b of input 310 is now connected directly to complex nodes 430 and 440. Complex nodes 430 and 440 are in turn connected directly to input terminal 321 of output 320. Due to these re-established connections, input node 342 and output node 344 are no longer necessary, and are not added to the target flow 400.

As will be seen, while the target flow 400 has been flattened one hierarchical level from the source flow 300, due to re-establishment of the node terminal connections as described, data flowing through either the source flow 300 or the target flow 400 will be processed in the same way.

After all complex nodes at the top hierarchical level have been flattened by one level, if the target flow is not completely flat, the process may be repeated. Thus, the target flow 400 may become a new source flow, and a new target flow 500 (FIG. 5) may be defined.

Applying pseudo-code 200, any primitive nodes at the top level (i.e. input 310 and output 320) are again added to the target flow in their existing form. Any complex nodes are again replaced by subflows in the target flow, with connections re-established as per pseudo-code 200. Thus, complex nodes 410, 420, 430 and 440 are replaced by "subflow" nodes 510, 520, 530 and 540, which in this illustrative example perform a particular "compute" function, whatever that may be.

In the target flow shown in FIG. 5, connectors 350 are again re-established such that output terminal 312a of input 310 is connected directly to input terminal 511 of node 510, and to input terminal 521 of node 520. Nodes 510 and 520 are in turn connected directly to input terminal 321 of output 320. Similarly, output terminal 312b of input 310 is connected directly to input terminal 531 of node 530, and to input terminal 541 of node 540. Output terminals 513a, 523a, 533a, and 543a of nodes 530 and 540 are in turn connected directly to input terminal 321 of output 320.

Figure 5:
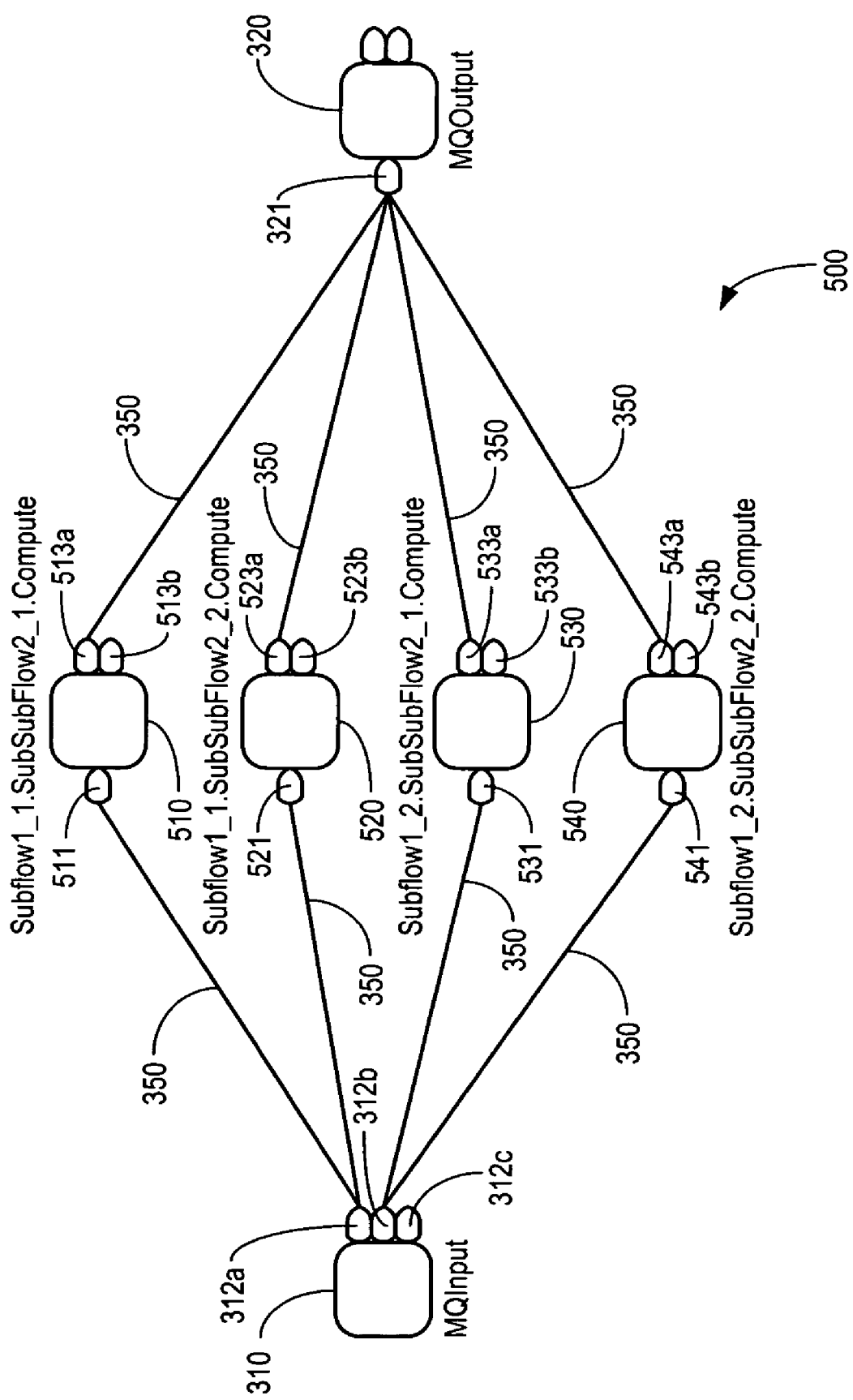
FIG. 5 is a schematic block diagram showing the hierarchically structured flow of FIG. 4 after another iteration of flattening.

As seen in FIG. 5, the connections to terminals 511 and 513a of node 510 have been maintained from that shown in FIG. 4. Similarly, the connections to terminals 521 and 523a of node 520 have been maintained; the connections to terminals 531 and 533a of node 530 have been maintained; and the connections to terminals 541 and 543a of node 540 have been maintained. Output terminals 513b, 523b, 533b, and 543b remain unconnected.

As a result of re-establishment of the terminal connections as described above, input nodes 512, 522, 532, 542 and output nodes 514, 524, 534, 544 previously shown in complex nodes 410, 420, 430, 440 are no longer necessary, and are not added to the new target flow 500.

While the target flow 500 has been flattened another level from the source flow (i.e. the previous target flow) 400, due to re-establishment of terminal connections as described above, data flow through the target flow 500 will be processed as if through the source flow 400.

As each node 510, 520, 530 and 540 is a primitive node, and there are no further complex nodes in the target flow 500, the flow has been completely flattened. Consequently, the pseudo-code 200 of FIG. 2 may exit the main loop and end.

The breadth-first approach to flattening hierarchically structured flows as described above allows flattening of a hierarchically structured flow in an iterative manner, based on the number of levels of hierarchy, and independent of the number of complex nodes at each level of hierarchy.

Advantageously, for flows that are generally broad, with a limited number of hierarchical levels, the breadth-first approach to flattening as described above provides an efficient alternative to known flattening techniques, which may otherwise require repeated loading of flows and subflows at each level of hierarchy in order to flatten a flow. In many common flow programming applications, such as transactions between financial institutions, it has been found that the breadth-first approach in accordance with the teachings of the present invention may be more suitable, as the flow models are typically broad, with a limited number of hierarchical levels. Of course, the flattening technique taught by the present invention may be used for numerous other applications.

The invention may be implemented as computer readable medium containing computer executable which, when combined or loaded on a computer system, performs the method steps of the invention. Such computer readable medium may include, but is not limited to, CD-ROMs, diskettes, tapes, hard drives, and computer RAM or ROM, or any medium, magnetic or optical, or the like, for storing signals readable by a machine for controlling the operation of a general or special purpose programmable computer according to the method of the invention and/or to structure its components in accordance with a system of the invention.

While various illustrative embodiments of the invention have been described above, it will be appreciated by those skilled in the art that variations and modifications may be made. Thus, the scope of the invention is defined by the following claims.

What is claimed is:

1. A computer system-implemented method of flattening a hierarchically structured source flow, said source flow including at least two levels of hierarchy with each level of hierarchy including one or more nodes interconnected by connectors, said computer system-implemented method comprising:
   (i) identifying, at a current top level of hierarchy in said source flow, any primitive node;
   (ii) adding to a target flow said primitive node identified in (i);
   (iii) identifying, at said current top level of hierarchy in (i), any complex node, each complex node containing at least one subflow with one or more nodes interconnected by connectors;
   (iv) adding to said target flow said at least one subflow in place of said complex node identified in (iii);
   (v) re-establishing connections between any nodes and subflows added to said target flow, and maintaining node terminal connections such that any data flowing through said target flow is processed as if through said source flow.

2. The computer system-implemented method of claim 1, further comprising:
   (vi) identifying whether there are remaining complex nodes in said target flow, and if so, providing an indication thereof.

3. The computer system-implemented method of claim 2, further comprising:
   (vii) responsive to said indication of remaining complex nodes in said target flow, defining said target flow to be a new source flow, defining a new target flow, and repeating each of (i) to (v) for said new source flow.

4. The computer system-implemented method of claim 1, wherein, at (v), re-establishing connections between any nodes and subflows added to said target flow proceeds as follows:
   a connection in said source flow that connects an origin primitive node to a destination primitive node is re-established in said target flow without modification;
   a connection in said source flow that connects an origin primitive node to a destination, complex node is replaced in said target flow by a re-established connection that connects said origin primitive node to a node in each subflow that was previously connected to an input node of said destination complex node;
   a connection in said source flow that connects an origin complex node to a destination primitive node is replaced in said target flow by a re-established connection that connects a node in each subflow that was previously connected to an output node of said origin complex node to said destination primitive node;
   a connection in said source flow that connects an origin complex node to a destination complex node is replaced in said target flow by a re-established connection that connects a node in each subflow that was previously connected to an output node of said origin complex node, to a node in each subflow that was previously connected to an input node of said destination complex node.

5. The computer system-implemented method of claim 4, further comprising:
   (vi) identifying whether there are remaining complex nodes in said target flow, and if so, providing an indication thereof.

6. The computer system-implemented method of claim 5, further comprising:
   (vii) responsive to said indication of remaining complex nodes in said target flow, defining said target flow to be a new source flow defining a new target flow, and repeating each of (i) to (v) for said new source flow.

* * * * *